(12) United States Patent
Grabovski et al.

(10) Patent No.: US 9,911,138 B2
(45) Date of Patent: Mar. 6, 2018

(54) AUTOMATED LIMITED-TIME RETAIL MERCHANDISE PROMOTION SYSTEM

(71) Applicant: Wal-Mart Stores, Inc., Bentonville, AR (US)

(72) Inventors: Vadim Grabovski, Fayetteville, AR (US); Charles Rine, Bentonville, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 951 days.

(21) Appl. No.: 13/866,252

(22) Filed: Apr. 19, 2013

(65) Prior Publication Data
US 2014/0316901 A1 Oct. 23, 2014

(51) Int. Cl.
*G06Q 30/00* (2012.01)
*G06Q 30/02* (2012.01)
*G06Q 20/38* (2012.01)

(52) U.S. Cl.
CPC ....... *G06Q 30/0268* (2013.01); *G06Q 20/387* (2013.01); *G06Q 30/0207* (2013.01); *G06Q 30/0267* (2013.01)

(58) Field of Classification Search
None
See application file for complete search history.

(56) References Cited

U.S. PATENT DOCUMENTS

| | | | |
|---|---|---|---|
| 4,929,819 A | 5/1990 | Collins, Jr. | |
| 5,504,322 A | 4/1996 | Pavlidis et al. | |
| 5,841,365 A | 11/1998 | Rimkus | |
| 5,870,714 A | 2/1999 | Shetty et al. | |
| 5,959,285 A | 9/1999 | Schuessler | |
| 6,069,596 A | 5/2000 | Marvin et al. | |
| 6,435,407 B1 | 8/2002 | Fiordelisi | |
| 6,439,939 B1 | 8/2002 | Jaeger | |
| 6,762,674 B2 | 7/2004 | Matsushita | |
| 6,830,197 B2 | 12/2004 | Rubin et al. | |
| 6,910,697 B2 | 6/2005 | Varatharajah et al. | |
| 6,914,648 B2 | 7/2005 | Niiyama et al. | |
| 7,095,794 B2 | 8/2006 | Claessen | |
| 7,403,909 B2 | 7/2008 | Haulk et al. | |
| 7,436,285 B1 | 10/2008 | Roquemore, III | |
| 7,648,068 B2 | 1/2010 | Silverbrook et al. | |

(Continued)

FOREIGN PATENT DOCUMENTS

EP  2431954 A1  3/2012

OTHER PUBLICATIONS

Stross, Randall, Digital Tags Help Ensure the Price Is Right, Feb. 9, 2013, New York Times, 2 pp (Year: 2013).*

(Continued)

*Primary Examiner* — Michael W Schmucker
(74) *Attorney, Agent, or Firm* — Schmeiser, Olsen & Watts LLP

(57) ABSTRACT

A computer-automated system is disclosed for promoting specifiable items of merchandise in a retail shopping facility for specifiable time periods. The automated promotion system enables a customer with an appropriately configured mobile device to avail of promotional prompts within the shopping facility electronically (i.e., within the specified time period), substantiating redemption of a related benefit at checkout (i.e., within or beyond the specified time period). The system has three principal components: a source, a node, and a checkpoint. The source enables a retailer to script the parameters of the promotion (e.g., the duration, benefit, and relevant merchandise). The node—preferably, an electronic shelf label—provides means for publishing the promotion to a customer pursuant to information entered by the retailer at the source. The checkpoint consummates the promotion.

16 Claims, 5 Drawing Sheets

(56) References Cited

U.S. PATENT DOCUMENTS

| | | |
|---|---|---|
| 8,011,596 B2 | 9/2011 | Longacre, Jr. |
| 8,258,921 B2 | 9/2012 | Hashiguchi et al. |
| 2010/0001924 A1 | 1/2010 | Nobutsugu et al. |
| 2010/0287057 A1* | 11/2010 | Aihara ............... G06K 7/1095 705/16 |
| 2011/0128126 A1 | 6/2011 | Nilsson et al. |
| 2012/0161932 A1 | 6/2012 | Byun et al. |
| 2013/0036636 A1 | 2/2013 | Karhuketo et al. |

OTHER PUBLICATIONS

R. Gardner, "An Executive Brief: Electronic Shelf Labels", VDC Research Group (May 2008).
Vestcom Executive White Paper, "Electronic Shelf Labels", Vestcom International Inc. (Oct. 2009).
R. Thomson, "Analysis: Is dynamic pricing about to take off in retail?", RetailWeek (Nov. 7, 2013).
J. O'Donnell, "Line Cutting: Mobile Checkout Headed to a Store Near You", USAToday.com (Jul. 25, 2012).
S. Banjo, "Wal-Mart is Testing Mobile Checkout", WSJ.com (Sep. 3, 2012).
C.B. Darling and J.W. Semich, "Walmart's IT Secret: Extreme Integration" (1996), available at <www.asiassociates.com).
R.N. Bolton et al., "Recent Trends and Emerging Practices in Retail Pricing", Retailing in the 21st Century, New York: Springer, pp. 255-270.
Walmart FAQ Brochure, "Scan & Go: Skip the Checkout Line", available at Walmart.com.

* cited by examiner

AUTOMATED LIMITED-TIME RETAIL MERCHANDISE PROMOTION SYSTEM

FIELD

The present invention is directed, in general, to retail promotion systems, and in particular, to an automated system for promoting specifiable items of retail merchandise for specifiable time periods.

BACKGROUND

In retail store facilities, sales are consummated typically at a "point-of-sale" or "checkout" station. It is here that a customer makes payment to the retailer in exchange for items of merchandise obtained from the store's sales floor. The checkout process is often administered by an attendant (e.g., a sales associate or cashier) responsible for itemizing the merchandise, calculating a total price, presenting it to the customer, and receiving and/or recording the customer's payment.

To improve efficiency, several retailers have lately been installing "self-service" checkout stations, which—through the use of computer terminals equipped with bar code scanners, scales, and automated payment devices—enable customers to checkout their merchandise themselves. Since a single store associate can monitor several such self-service checkout stations at one time, a retailer can "open" more queues, shorten checkout lines, reduce wait times, and increase customer throughput.

In a drive to attain even further efficiency, retailer are now beginning to investigate and adopt so-called "mobile checkout" systems. In such systems, a mobile device with scanning capabilities (such as a smartphone) is used by a customer while shopping to scan items as they are retrieved and deposited into the customer's shopping cart. When the customer has finished shopping, the mobile device is brought to a checkout station, where information captured from the device, having been extracted at that point or earlier, is used to consummate the purchase quickly, without having to undergo additional item tabulation and/or scanning.

While the technical sophistication of retail checkout processes continues to evolve, it is well understood that any advantages attainable through such improvements will be limited naturally by customer adoption rates. Accordingly, the investigation into novel features that would be attractive to customer and that could be used in combination with modern electronic checkout systems continues to be an area of interest among retailers.

SUMMARY

In light of the above, the present invention provides a computer-automated system for promoting specifiable items of merchandise in a retail shopping facility for specifiable time periods. The automated promotion system enables a customer with an appropriately configured mobile device, such as the customer's smartphone, to avail of promotional prompts published electronically by the retailer within the shopping facility. The customer's response to the prompt is recorded electronically, providing in due course, the temporal substantiation sought for redemption of the related benefit at checkout.

The system (and its related methodology) provides the retailer with the capability to conduct discrete product promotions at an unprecedented level of specificity. The system would, for example, enable a store manager to launch targeted promotional efforts precisely at "slow moving" products.

The system is also compatible within "full-service", "self-service", and "mobile" checkout systems. A combination therewith would provide additional opportunities for discounts, price rollbacks, and like pecuniary benefits, and as such, would be expected to be viewed favorably by retail customers.

The automated promotion system comprises a merchandise information source, a merchandise information node, and a merchandise information checkpoint. The merchandise information source enables a retailer to script the parameters of the promotion (e.g., the duration, benefit, and relevant merchandise). The merchandise information node—preferably an electronic shelf label—provides means for publishing the promotion to a customer pursuant to information entered by the retailer at the merchandise information source. And, the merchandise information checkpoint provides the means for consummating the promotion.

The automated promotion system is preferably used in combination with a software application installed and executing on a customer's personal smartphone (or other like mobile device). The software application is engineered to drive an electronic scanner integrated into the mobile device and record scanned data into the device's data storage, thereby providing the means for capturing an "electronically-recordable customer transaction" that will affect in due course the purchase of the item of merchandise at the merchandise information checkpoint.

In sum, it is a principal object of the present invention to provide a computer-automated system for promoting retail merchandise.

It is another object of the present invention to provide a computer-automated system for promoting a specifiable item of merchandise in a retail shopping facility for a specifiable time period.

It is another object of the present invention to provide a computer automated system for promoting retail merchandise, wherein the system utilizes so-called "electronic shelf labels" and is compatible within a "mobile checkout" framework.

It is another object of the present invention to provide a computer-automated system for promoting a specifiable item of merchandise in a retail shopping facility for a specifiable time period, wherein the system comprises a merchandise information source, merchandise information node, and merchandise information checkpoint.

It is another object of the present invention to provide a method for conducting a specifiable limited-time product promotion utilizing a mobile device provided with software capable of recording a customer transaction performed in response to a promotional prompt published at an electronic shelf label.

For a further understanding of the nature and objects of the invention, reference should be had to the following description taken in conjunction with the accompanying drawings.

DETAILED DESCRIPTION

Figure 1:
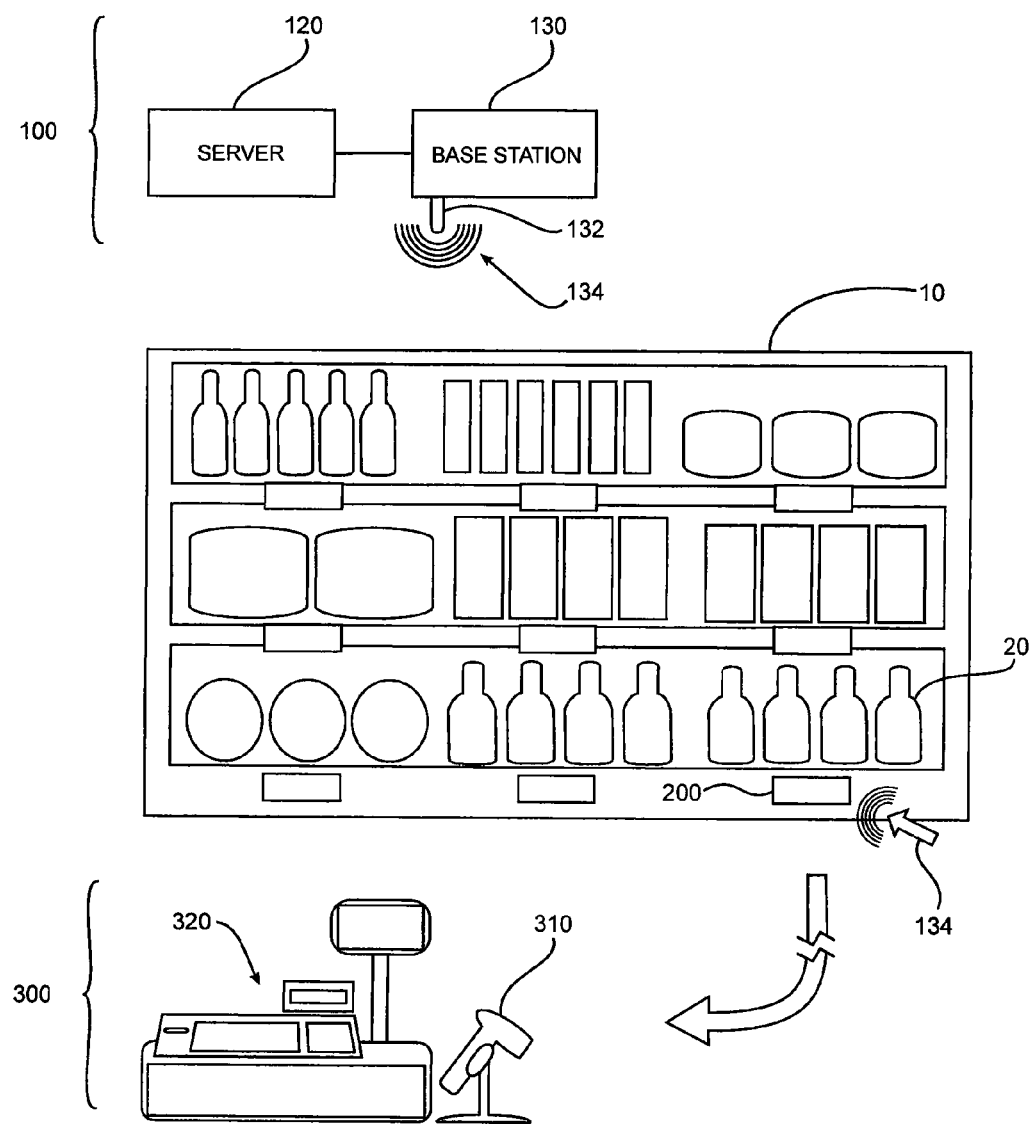
FIG. 1 illustrates schematically a merchandise promotion system, according to an embodiment of the present invention, comprising an merchandise information source 100, a merchandise information node 200, and a merchandise information checkpoint 300.

FIG. 1 provides a representative outline of the basic elements of the inventive system. As shown therein, the merchandise promotion system comprises three basic elements: i.e., merchandise information source 100, a merchandise information node 200, and a merchandise information checkpoint 300.

Figure 2A:
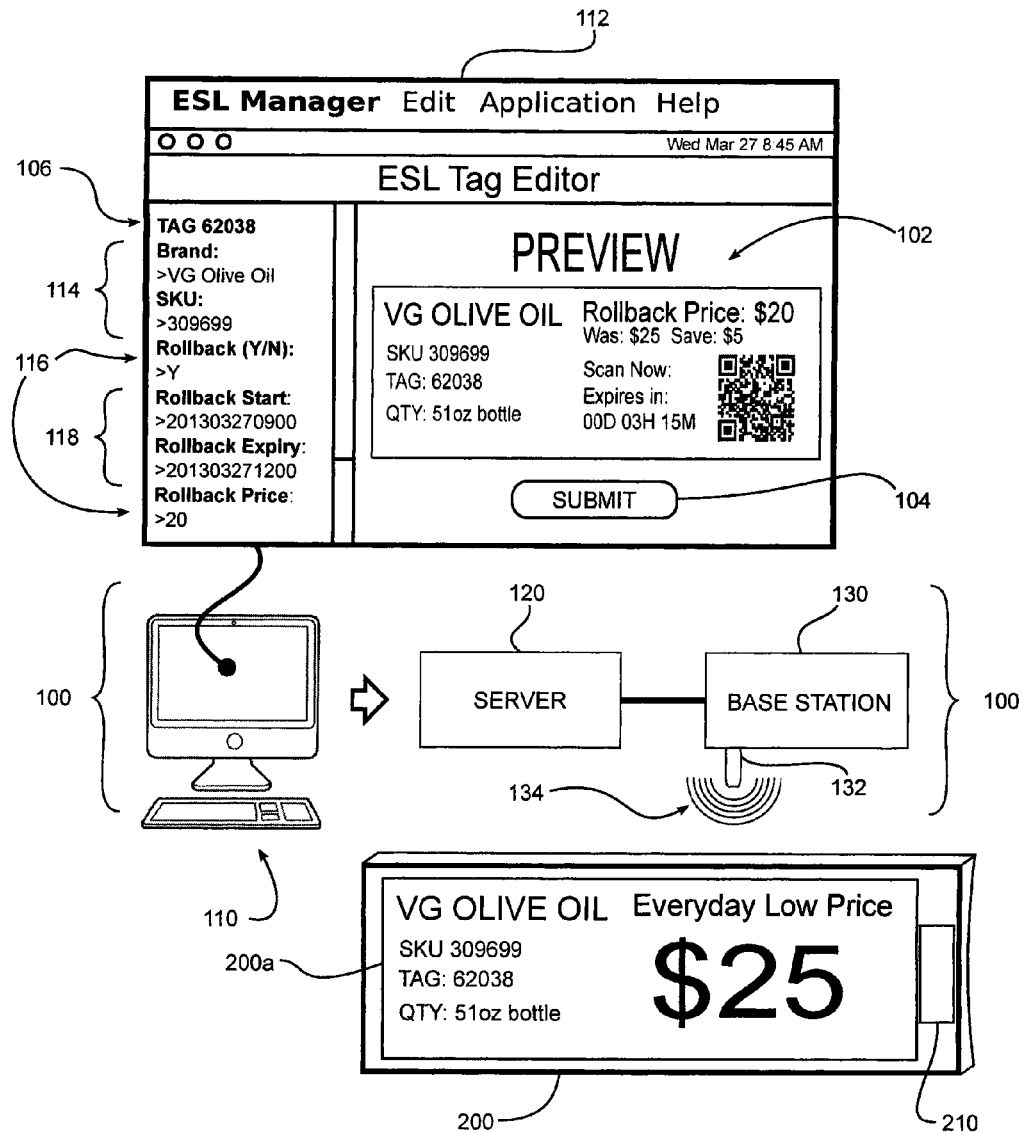
FIG. 2A illustrates schematically particular components of the merchandise information source 100 and the communicative relation thereof to a merchandise information node 200.

The merchandise information source 100, as shown in FIG. 2A, comprise an interface 112 for input of limited-time merchandise information 118 and a transmitter 130 and 132 for transmission of said information to the merchandise information node 200, the information being associated with an item of merchandise an having a predefined expiration.

Figure 2B:
FIG. 2B illustrates schematically different merchandise information displays 200a and 200b presented on merchandise information node 200 at different times.
Figure 3:
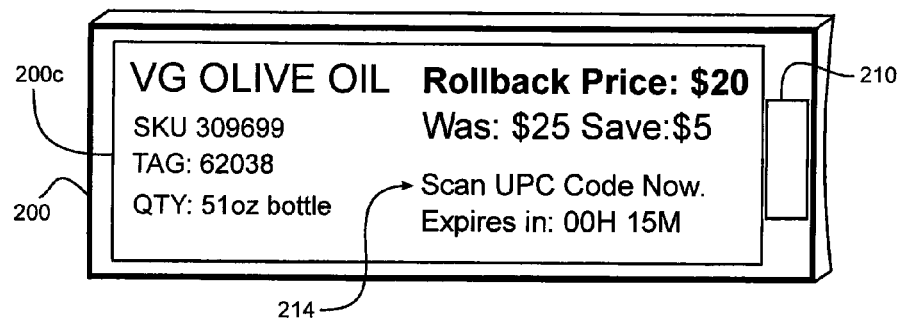
FIG. 3 illustrates schematically a particular type of merchandise information display 200c, presented on a merchandise information node 200, according to an embodiment of the present invention.

The merchandise information node 200, as shown in FIGS. 2A, 2B, and 3 comprises a receiver 210 for reception of the limited-time merchandise information and a display 200a-c for the visual presentation of said information. The display—as seen in FIG. 1—is located within "visual proximity" of the item of merchandise 20 and provides a prompt (i.e., a "promotional prompt") calling for the performance by a customer of an "electronically-recordable customer transaction".

Finally, the merchandise information checkpoint 300 comprises an electronic processor capable of affecting a purchase of the item of merchandise as a function of the "electronically-registered customer transaction". Thus, the checkpoint 300 functions to redeem, validate, and/or bring into a effect the promotional benefit associated with the "promotional prompt".

As an adjunct to automated promotional system, the invention also provides a corresponding methodology.

This method comprises the steps of: providing a computer program executable on a portable device, wherein the portable device has an electronic scanner and data storage, and wherein the computer program is capable of driving the electronic scanner to scan an electronically-scannable tag and recording the scanned data in said data storage; providing an electronic shelf label in visual proximity to said item of merchandise, the electronic shelf label capable of receiving and visually-displaying said promotional information; transmitting said promotional information to said electronic shelf label, the promotional information being visually-presented by said electronic shelf label to prompt a customer equipped with said portable device to read said electronically-scannable tag; checking for the presence of scanned data recorded in the data storage of a portable device at a checkout register in said retail facility, the presence of said scanned data providing complete or partial validation of said promotional information for a customer bearing said portable device at said checkout register.

As used herein, limited-time merchandise information includes any information provided in any electronic form that is pertinent to an offer for sale by the retailer of, or otherwise associated with, an item of merchandise (i.e., a promotional component) and that has associated therewith a limited-time component (cf., an expiration). The merchandise information should not be expected to be static and unchanging. After input, the merchandise information can, in the course of is transmission and reception to and from the source and the node, be consolidated into an single data record (or string), and/or distributed among a plurality of data records (or strings), and/or combined or merged with other data.

In preferred embodiments, the promotional component of the information includes, but is not limited to, price discounts and reductions (e.g., price rollback programs), electronic coupons (cf., for current or future purchases of the same or different merchandise), and loyalty points (e.g., customer rewards programs and frequent flyer miles). Regardless of its content, the promotional component becomes applicable to a customer after an requisite validation of the time component.

The time component of the information is to be construed herein as including any data that defines and will effect directly or indirectly an automatic predefined expiration of the promotional component of the merchandise information. Although embodiments of the invention can include functions for renewing and/or extending the time limits, the input of the time limitation at the merchandise information source fixes, set, and/or otherwise limits the duration of the associated merchandise promotion. The duration thus can vary, but will nonetheless, in contrast to other merchandise data, always be pre-decided.

There is no particular limitation to the duration of the time component and can be anywhere from one or a few hours to several weeks and months if not years. Preferably, in view of the currently forecasted practical utilization of the invention, the duration would likely be under a day. This would be consistent with a preferred embodiment, wherein the window for validation, past the duration of the promotion, automatically expires at the end of the day.

There is no particular limitation on the design of the merchandise information source, provided its fundamental function of "feeding" the merchandise information node with limited-time merchandise information is served. This function involves, at least, an input interface and a transmitter. The input interface can comprise any means enabling a retailer to enter the data components that ultimately form the limited time merchandise information. The transmitter can comprise any means enabling the transmission of the time-limited merchandise information from the merchandise-information source to a merchandise information node.

A representative example of an interface 112, entitled "ESL Tag Editor", is illustrated in FIG. 2A. As shown therein, the interface 112 is provided via an application installed and executed on a personal computer 110, the personal computer 110 being in communication with an electronic shelf label server (ESL) 120, which in turn is in communication with an ESL base station 130.

The ESL Tag Editor interface 112 comprises input fields for entering "limited-time merchandise information" comprising, in particular, product information 114 (i.e., "Brand" and "SKU"), promotional information 116 associated with the product (i.e., "Rollback (Y/N)" and "Rollback Price"), and temporal information 118 (i.e., "Rollback Start" and "Rollback Expiry"). The time-limited merchandise information, together with other information from other sources (e.g., pricing and quantity information associated retrieved from another relationally-linked database) are processed into an image file(s) and transmitted to a predetermined ESL (cf., "Tag 62308" identified in field 106). Prior to submission, the image file(s) can be reviewed by the creator in preview display 103. When acceptable to the creator, the entries can be submitted by clicking button 104, whereupon the image file(s) are transmitted from the ESL server 120 to the ESL base server 130, converted to a radio signal 132, and ultimately acquired by the appropriate ESL 200 through a receiver contained, placed, and/or enclosed, for example, within region 210.

In the specific example shown in FIG. 2A, a rollback promotion—providing a price discount of $5 for product SKU 309699—is schedule to commence on Mar. 27, 2013 at 9:00 a.m. and expire 3 hours later at 12:00 p.m. As illustrated, the retailer submits this information (i.e., clicks the "Submit" button 104) at 8:45 a.m. After the designated commencement time, the existing image 200*a* on the ESL device 200 will be updated (e.g., as seen in image 200*b* in FIG. 2B, representing the state of the ESL device 200 at 9:23 a.m.) After the designated expiration time, the limited-time promotional image 200*b* displayed on ESL device 200 can revert back to its previous state (e.g., as shown in image 200*a* in FIG. 2B, representing the state of the ESL device 200 at 12:01 p.m.)

The ESL server 120 shown in FIGS. 1 and 2A comprises hardware and/or software assets used for managing, processing, or otherwise handling the data required for presentation of information on the merchandise information node 200. The ESL server 120 can be networked with, for example, other application servers and file servers, that may be called upon in the course of managing the ESL devices within a store. For example, certain product information can be contained within a retailer central product database, which is accessed through the ESL server, when such information is needed to update information published on an ESL device. ESL software can include ESL-related data recording, scheduling, transmitting, receiving, and editing functions; ESL device tracking and mapping functions; ESL base station management and control functions; and ESL security and access control functions.

In embodiments of the present invention where some or all of the limited-time merchandise information is converted into an optically scannable 2D or 3D bar code, the ESL server can also include programming for such conversion. This programming can be included within the firmware of an ESL device. With current technology, however, and in the interest of maintaining low power consumption at the ESL devices as—which are often battery powered—as well as keeping low the overall production costs and maintenance of such devices, the conversion is preferably hosted at the ESL server.

The ESL server can have its own user interface (e.g., via keyboard and monitor) or, as in the embodiment of FIG. 2A, is accessed by a user (e.g., a retail store manager) through a terminal or personal computer 110, with appropriate retailer network authorizations, permissions, and/or privileges. In the former case, the ESL server can essentially be a personal computer, located for example, in the back office space of a retail establishment, with all hardware and software assets needed for ESL management locally provided. In the latter case, the ESL server can be located in remote network, and accessed through a personal computer located remotely or in a local administrative back office.

Technical configuration and details of various ESL servers are known. Various ESL server configurations and operations can be found disclosed, for example, in U.S. Pat. No. 8,258,921, issued to N. Hashiguchi et al. on Sep. 4, 2012; U.S. Pat. No. 5,870,714, issued to D. K. Shetty et al. on Feb. 9, 1999; U.S. Pat. No. 5,841,365, issued to J. S. Rimkus on Nov. 24, 1998; U.S. Pat. App. Pub. No. 2012/0161932, filed by G. Y. Byun et al. on Jul. 27, 2011; and U.S. Pat. No. 7,403,909, issued to K. W. Haulk et al. on Jul. 22, 2008.

The base station 130 shown in FIGS. 1 and 2A provided an example of a transmitter, useful in proving a communications channel between an electronic shelf label (ESL) server 120 and an electron shelf label device 200. Examples of ESL base stations and components thereof are disclosed, for example, in U.S. Pat. No. 7,095,794, issued to A. M. G. Claessen on Aug. 22, 2006; U.S. Pat. No. 7,436,285, issued to J. P. Roquemore, III on Oct. 14, 2008; and U.S. Pat. No. 6,762,674, issued to N. Matsushita on Jul. 13, 2004.

The computer 110, ESL server 120, and the base station 130 can exist within a much larger retailer-operated network. A computer network used by the retailer to host the merchandise information source can comprise a plurality of interconnected computers and terminals, servers, data storage facilities, hub, routers, switches, network security devices, network management devices, wireless nodes and access points, load balancers, and related software. Within this network, data relating to the time-limited merchandise information can be stored within the network's data storage facilities, with the ESL server drawing upon, interacting with, and providing access to such data.

The data storage facilities can comprise one or more data storage devices capable of recording and retrieving digital information from a medium (e.g., magnetic, optical, semiconductor, etc.). For small to medium-scale retailers, the data storage facilities can utilize storage with comparative modest capacity, such as provided by a single internal or external hard drive or flash drive. For larger global retailers, the data storage facilities will require greater capacity and bandwidth, and thus, may employ several networked and attached data storage components, these being deployed at an enterprise-scale and may include, for example, arrays of data servers and file servers; SAN and NAS storage facilities; RAID storage systems; data backup, archiving, and redundancy facilities; and data management and load balancing agents.

As shown in FIGS. 1 and 2A, the information-bearing signal 134 transmitted from the ESL base station 130 is received by a merchandise information node 200.

The merchandise information node 200 can be provided through well known display devices of various configurations, but will comprise, at the least, a receiver and a display. As stated above, the receiver (e.g., housed in region 210) functions to receive the information-bearing signal 134 from the base station 130. Device identification, authentication, and handshaking protocols are well known and can be selected and deployed based on the individual specific needs of the retailer.

Once received, the signal is processed by internal circuitry and logic to extract and use the time-limited merchandise information for visual presentation thereof on the display. In accordance with the invention, this visual presentation (cf., display 200*b*) is temporary, contemporaneous with the duration of the promotion, and reverting back to any default information previously displayed on the merchandise information node 200 (cf., display 200*a*). The duration of the visual presentation is a function of the predefined expiration data entered at the merchandise information source 100.

The predefined expiration data can either be intrinsic or extrinsic to the limited-time merchandise information. If intrinsic, the expiration data is incorporated into and part of the file(s) or data string(s) constituting the limited-time merchandise information. Accordingly, the duration of the visual present can be controlled locally, for example, at an appropriately configured merchandise information node 200. If extrinsic, the expiration data remains at the merchandise information source 100, which accordingly controls the duration of the visual presentation.

The limited-time merchandise information is visually presented to provide a prompt for performing an electronically-recordable customer transaction. The electronically-recordable transaction can be, for example, the scanning of a bar code provided on the merchandise information node 200, the scanning of a bar code visually presented on the display 200b, the scanning of a bar code on an item of merchandise 20, the swiping of a customer account card using a magnetic stripe reader, and the scanning of an RFID tag on or near the merchandise information node or item of merchandise.

The prompt provides implicit and/or literal instructions or guidance to a customer on an action to be performed by the customer to participate in the limited-time promotion. For example, as shown in FIG. 2B, a merchandise information node 200 visually presents a display 200b advertising a temporary price (i.e., "$20") available for a limited time (i.e., "02H 37M") which can be obtained by scanning barcode 212 as per the literal prompt 214 (i.e., "Scan Now"). A similar explicit prompt 214 (i.e., "Scan UPC Code Now") is used in the display 200c illustrated in FIG. 3, representative of embodiments that do not rely upon a bar code displayed on the merchandise information node 200.

Through the use of externally provided instructions (e.g., via newsletters, advertisements, commercials, store circulars, and in-store instructional documentation, placards, and signage), an understanding of the actions needed to participate in the limited-time promotion can be developed among customers, enabling the use of less explicit or narrative prompts. For example, instructional signage placed in a retail facility can provide an outline of the promotion, together with a fulsome description of the steps involved for participation, enabling a retailer to reduce the amount of words or other information used for the prompt. Along these line, a bar code (or other optically-scannable scannable indicia) can alone serve as an implied prompt.

In respect of the customer transaction being "electronically-recordable", it will be appreciated that, although not excluded from the invention, recordation is generally not performed by or at the merchandise information node 200. Rather, as discussed further below, recordation is preferably effected through the use of a customer-operated mobile device, which can either be owned by the customer, or provided for the customer's use by the retailer within the retail facility.

Useful and/or desirable formats for machine-readable indicia would include any of the matrix, geometric, and bar code formats currently available and well known to those skilled in the art. Examples of such formats can be found in U.S. Pat. No. 5,504,322, issued to T. Pavlidis et al. on Apr. 2, 1996; U.S. Pat. No. 5,959,285, issued to F. Schuessler on Sep. 28, 1999; U.S. Pat. No. 8,011,596, issued to A. Longacre, Jr. on Sep. 6, 2011; and U.S. Pat. No. 6,830,197, issued to K. T. Rubin et al. on Dec. 14, 2004. Due in part to its storage capacity—and in part to its widespread adoption by retailers, customers, and smartphone application developers—the preferred format is the so-called QR code format.

As shown in FIG. 2B, the QR ("Quick Response") code is a high density matrix bar code that utilizes three square targets at three of its corners (i.e., upper left, upper right, and bottom left corners) and a smaller square target near its fourth corner to normalize the code image for size, orientation, and angle of viewing. The international standards and technical specifications for the creation and use of QR codes are defined in ISO/IEC 18004, available from the International Organization for Standardization (ISO) in Geneva, Switzerland (<http://www.iso.org>).

The amount of data stored in a QR code will largely depends on the overall dimensions of the array. "Version 1" of a standards-compliant QR code (i.e., the least capacious version) is a 21×21 array having a capacity of 72 data bits at high (type "H") error correction. "Version 40" (i.e., the most capacious) is a 177×177 array having a capacity of approximately 23K at low (type "L") error correction.

When used for the present invention, the type of data stored within the QR code will vary. In one embodiment, for example, the QR code can encode an alphanumeric string (or other data sequence) that is decoded or otherwise extracted through software executed on a mobile capture device, and subsequently processed therein, and/or at the merchandise information checkpoint 300, and/or within other processing facilities in the retailer's computer network, for use at checkout. When processed, the QR code can, for example, trigger the generation of a electronic coupon, or update the contents of a virtual shopping cart, or provide—in a comparatively simple embodiment—a text file that can be read at checkout, electronically or by an attendant.

As an alternative to wireless communication, the merchandise information node 200 can be updated via wired communication. Wired deployments do however have difficulties in respect of layout limitations caused by the complicated cabling likely needed to connect a high number of individual ESL displays. Wireless ESL deployments are, in this regard, preferred.

Examples of various ESL device, and components thereof, are discussed in, for example, U.S. Pat. No. 6,069,596, issued to R. H. Marvin et al. on May 30, 2000; U.S. Pat. No. 6,914,648, issued to S. Niiyama et al. on Jul. 5, 2005; U.S. Pat. App. Pub. No. 2013/0036636, filed by H. Karhuketo et al. on May 9, 2011; and U.S. Pat. App. Pub. No. 2011/0128126, filed by B. Nilsson et al. on Feb. 7, 2011.

ESL devices used for the merchandise information node 200 of the present invention can include a variety of components, such as an addressable electooptical flat panel display, a transmitter, a receiver, a power source, mounting hardware, and standard ESL circuitry.

In respect of the display, an electrophoretic display (i.e., so-called "electronic paper" displays) are particularly well-suited for the present invention. These "bi-stable" displays are typically based on a thin layer of microcapsules filled with electrically charged dyed particles and provide a paper-like high contrast appearance, ultra-low power consumption, and a thin light form. Power can be supplied by wired connections, but more typically, a battery is used. "Bi-stability" confers the ability to create a stable image without continuous supply of power, thereby reducing power consumption and the frequency of batteries replacement.

The invention is not limited to any particular mechanical placement or means for mounting the merchandise information node, nor is the invention limited to any particular distribution of these nodes throughout a retail store facility. For example, a node 200 can be integrated into the shelving framework, or clipped onto the front edge of a shelf, or slid into or otherwise engaged with a coupling track on a shelf rail, or rested upon or placed in a display stand.

In respect of its relative position, the merchandise information node 200 is placed in the visual proximity of the item of merchandise 20 with which it is associated. Whether it is above, below, or to either side thereof is of no relevant consequence. The capability of the node to adequately prompt a customer to avail of a promotion associated with a specific product is preserved as long as a customer can see both from the same position, and thereby associate one with the other.

The merchandise information checkpoint 300 provides a means for validating, redeeming, or applying a promotion, or otherwise affecting a purchase of an item of merchandise as a function of the electronically-recorded customer transaction prompted at the merchandise information node 200.

If the customer did not respond to any prompts, the merchandise information checkpoint 300 is used for normal checkout operations. On the other hand, if the customer did respond to a prompt, in addition to basic checkout operations, the merchandise information checkpoint 300 would be used execute the processes scripted to effect the promotion. Thus, for example, if the promotion provides a price discount, the checkout price is reduced. If the promotion provides loyalty points, these are added at checkout. If the promotion call for coupons redeemable for future purchase, these can be printed together with the receipt for final purchase. Other promotional scenarios should be apparent.

Typically, to proceed through its checkout processes, information is exchanged between the merchandise information checkpoint 300 and a customer-operated mobile device 400. This is not however always the case. Despite having been used for responding to the promotional prompts published at the merchandise information nodes 200, the customer-operated mobile device need not necessarily be involved in any of the checkout processes conducted at the merchandise information checkpoint 300.

For example, a electronically-recorded customer transaction can be uploaded (either contemporaneously with its performance or over the course of shopping prior to checkout) to a customer account service hosted on the retailer's computer network (e.g., a virtual shopping cart provided in conjunction with a mobile checkout program). Thus, at checkout, the merchandise information checkpoint 300 would need only to access the customer account in order to consummate the customer's purchases, including redeeming any electronically-captured promotions.

Furthermore, access need not necessarily require or involve the mobile device. Access can also be accomplished, for example, by "swiping" a customer account card or by manually entering account information into a checkout terminal 320. In either event, the customer's purchase will be modified to the extent that the customer had timely responded to a limited-time promotional prompt.

Since the present invention seeks to provide a "limited-time" promotion, the time at which the promotion is accepted by a customer is important. Accordingly, in combination with other well known validation processes (e.g., customer identification), the merchandise information checkpoint 300 should also be capable of providing a time check. In this regard, two general approaches can be implemented.

First, the merchandise information checkpoint 300 can be configured to communicate with the mobile device used by the customer whilst shopping and directly extract information recorded thereon indicative of the time in which the prompted customer transaction had been electronically recorded. This information can be, for example, a date/time stamp created by the mobile device contemporaneously with the electronic recordation. Alternatively, the information could also be any information (such as an image, file, or the aforementioned "alphanumeric string") that was presented at the merchandise information node 200 only for a known pre-defined time period. The presence of such short-lived ephemeral information on the mobile device would be indicative of timely participation in the promotion.

Second, the merchandise information checkpoint 300 can be configured to communicate with the mobile device to extract information (e.g., a customer account number) that leads, for example, to an extrinsic file (e.g., a customer account) hosted on the retailer's computer network, where the desired authentication and validation operations are performed, including any related date/time checks. In this configuration, the merchandise information checkpoint 300 will apply promotional benefits based on time signatures and/or data indicated or otherwise provided in extrinsic file(s) (i.e., files that reside neither in the merchandise information checkpoint 300 or in a customer-operated mobile device 400.

For the present invention, the key component of the merchandise information checkpoint 300 is an electronic processor capable of affecting a checkout purchases as a function of the electronically registered customer transaction. Other capabilities and/or other components can of course be included.

For example, in embodiments of the inventive system wherein the prompted customer transaction is to be electronically recorded on a customer-operate mobile device 400, the merchandise information checkpoint 300 should include means for communicating with and extracting information from that mobile device (e.g., a bar code scanner 310 and bar code processing software). Similarly, in embodiments of the inventive system wherein the prompted customer transaction is to be electronically-recorded extrinsically in a customer account hosted on the retailer's computer network, the merchandise information checkpoint 400 should include means for accessing and communicating with that network (e.g., via IEEE 802.11-based wireless communication channels or through IEEE 802.3-based wired communications).

In addition, preferred configurations for the merchandise information checkpoint 300 will also include an optical bar code or RFID scanner; a keyboard for manual entry of data; data communication ports; a printer for printing receipts; and cash and bank card payment systems. The latter can include a magnetic stripe reader, a cash drawer, and—for self-service checkout stations—a bank note scanner and change dispenser.

The construction, programming, deployment, installation, and operation of devices, components, systems, sub-systems, modules, and accessories that can be integrated into the merchandise information checkpoint 300 are well known. The merchandise information checkpoint 300 and/or components, can be custom-engineered, retrofitted from an existing checkout system, or simply purchased. As to the latter, point-of-sale systems and components are available commercially from, for example, Casio Corporation (Tokyo, Japan), Sharp Corporation (Osaka, Japan), NCR Corporation (Duluth, Ga.), Toshiba TEC Corporation/IBM (Tokyo, Japan), and Hewlett-Packard Company (Palo Alto, Calif.).

As an alternative to "fixed" point-of-sale systems, "mobile" point-of-sale systems can also be employed. In these systems, mobile handheld devices equipped with bar code readers and credit card scanners are used to consummate checkout. Such mobile systems and components thereof are commercially-available from, for example, NCR Corporation (Duluth, Ga.), Verifone Systems, Inc. (San Jose, Calif.); LightSpeed Retail, Inc. (Montreal, Calif.); and Hewlett Packard Company (Palo Alto, Calif.).

When a limited-time promotion is in effect, a promotional prompt will be present at the merchandise information node 200 for the predefined duration of the promotion. Electronic acceptance of the promotion within this window of opportunity, pursuant to the invention, needs ultimately to be communicated to the merchandise information checkpoint 300 for it (i.e., the timely acceptance) to affect purchase. This functionality is preferably performed through the use of a customer-operated mobile device.

The preferred mobile device is equipped with both an electronic scanner and data storage. The electronic scanner is used to read merchandise tags and labels, such as when a customer logs those products in the course of retrieving and depositing them in a shopping cart. Data storage is used to support the recording by (and other functions of) the electronic scanner. For example, a rolling inventory, list, or tabulation of the contents of the customer's shopping cart, together with the electronically-recorded customer transactions that ensue from promotional prompts (i.e., capture data), can be stored, maintained, and retrieved from the device's data storage. As mentioned further below, such information can also be uploaded into network storage facilities hosted within the retailer's computer network.

Preferably, the customer-operated mobile device is a customer-owned personal smartphone, such as an Apple "iPhone", a Samsung "Galaxy", a Motorola "Droid", an LG "Optimus", or a Blackberry "Curve". Supporting the use of personal smartphones offers several advantages. Smartphone are now in broad usage and have standard features useful for practicing the invention, such as a digital camera (which can be used as an optical bar scanner) and integrated wireless and internet connectivity (which can be used for data and information exchange). Smartphones in general also have deep data processing capability and typically run on a operating system designed to host third party software (i.e., "apps"). Finally, customers will likely already be familiar and comfortable with the operation of their own personal smartphones. Downloading and using a retail shopping app thereon should be fairly straightforward, leading potentially to better rates of adoption and system utilization.

As an alternative or adjunct to the use of a customer's personal smartphone, a retailer can also provide appropriately configured mobile devices to customers for use within the retail store facility. This approach could provide a retailer broader latitude for incorporating features (such as an RFID tag reader) that may otherwise be difficult to support within the constraint of third party smartphones and/or their operating systems. Restricting the invention to use only of retailer-developed mobile device could also engender better security and more robust overall performance. It would also be easier for store associates to provide assistance to customers in the use of a singular mobile device platform, rather than a plethora of varying types and configurations of personal smartphones.

Regardless, where personal smartphones are to be supported within the retailer's system, a smartphone app must be provided by the retailer (or authorized agent) to provide the specific functionality that would not likely be integral to such smartphones, but is otherwise needed for the invention. The key functionality here is, of course, the ability to respond appropriately to the promotional prompts presented at the merchandise information nodes as specifically deployed by the retailer.

Thus, if the retailer's system uses a promotional prompt that calls for the scanning of a QR code, the smartphone app should include a QR barcode reader and related information processing and recording software. Likewise, if the retailer's system uses a promotional prompt that calls for a customer to scan a UPC barcode, the smartphone app should include a UPC barcode reader and related information processing and recording software.

Other desirable functionality includes: Means for uploading information (e.g., the "electronically-recordable customer transaction) to a customer account on the retailer's computer network; price checking and comparison; customer account access; the "virtual shopping cart" discussed further below; means for date/time stamping capture data; and means for communicating with or transferring information to the merchandise information checkpoint 300.

Figure 4A:
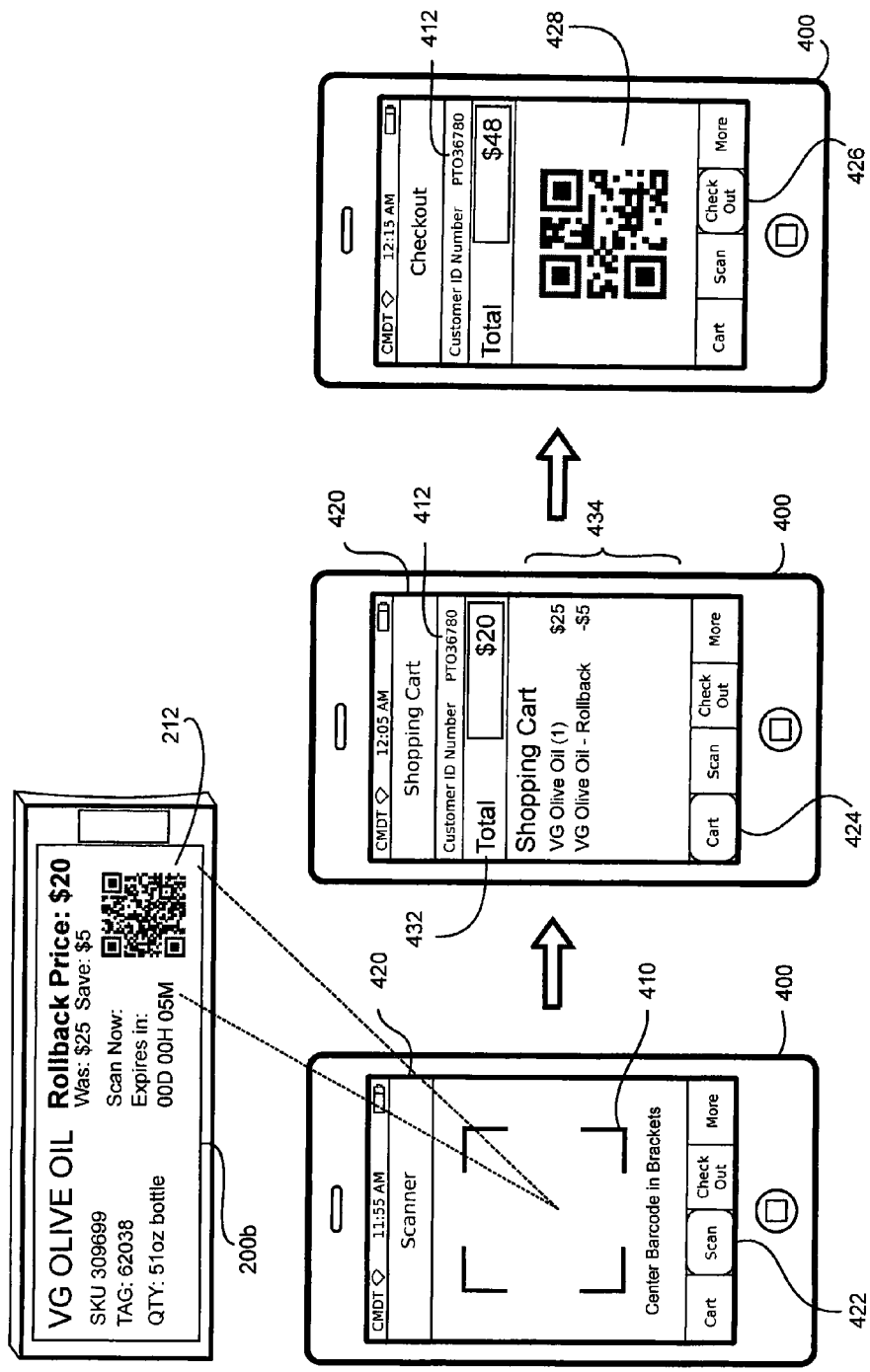
FIG. 4A illustrates schematically the use of a smartphone application 420 for scanning a bar code 212 which is provided in a merchandise information display 200b.
Figure 4B:
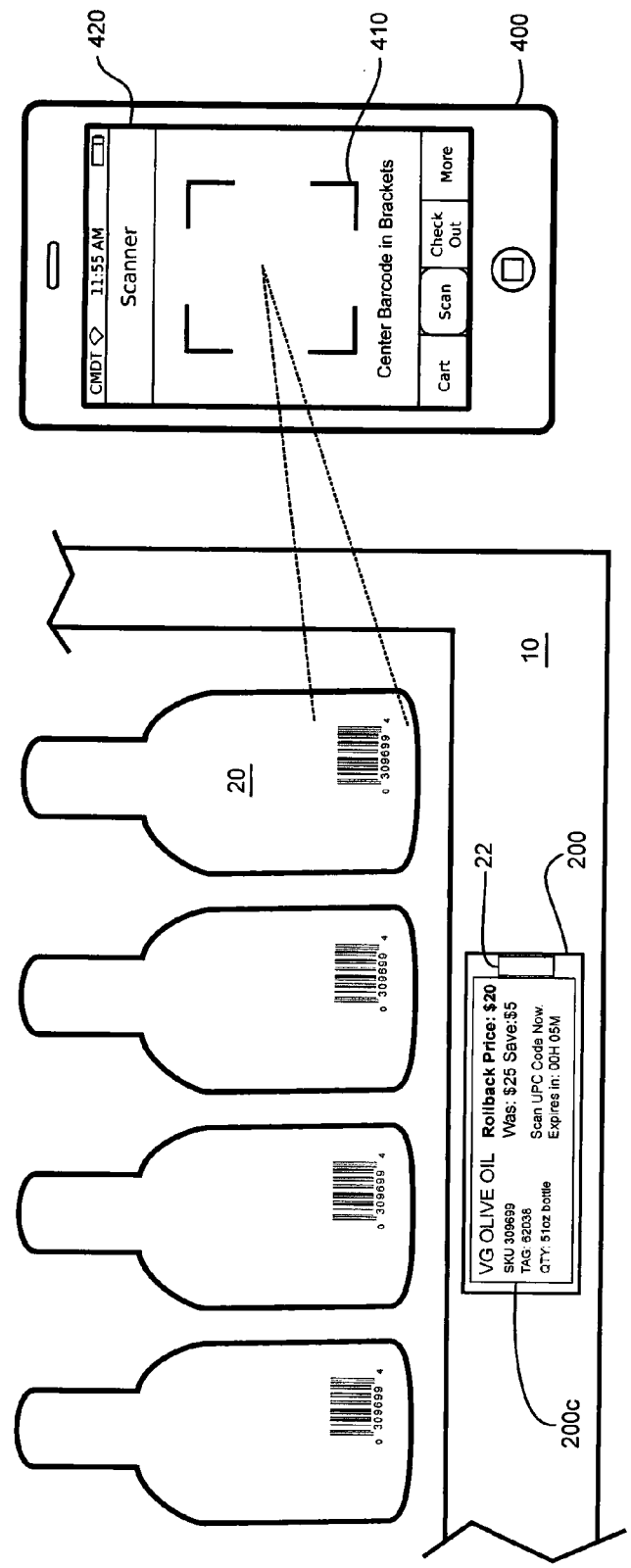
FIG. 4B illustrates schematically the use of a smartphone application 420 for scanning a bar code 22 which is—in contrast to FIG. 4A—provided on an item of merchandise 20.

A representative example of a smartphone app 420 is illustrated schematically in FIGS. 4*a* and 4*b*.

As shown in FIG. 4A, the smartphone app 420 installed onto smartphone 400 provides a "Scan" function 422, which using the smartphone's integrated digital camera (not shown) to capture a QR code 212 presented on ESL display 200*b* when the image thereof becomes resolved within the focusing bracket 410 and recognized by the app's logical processes. Once captured, the QR code is translated, and the information provided thereby (i.e., "capture data") transferred into a customer "virtual shopping cart", either within local smartphone data storage or within a customer account hosted on the retailer's computer network.

The capture process is similar where the prompt calls for the scanning a UPC label on an item of merchandise, rather than a bar code presented at a merchandise information node. As shown in FIG. 4B, the display 200*c* on node 200 advertises the promotion, but acceptance thereof is effected by scanning a UPC code on an item of merchandise 20, rather than a bar code presented on an electronic shelf label. The customer thus uses smartphone 400 to read the UPC code on the item 20 by imaging it onto the app 420's focusing brackets 410.

The contents of the shopping cart are inventoried on a rolling basis as the customer continues shopping. The inventory is accessible to the customer, for example, by activating the "Cart" button 424, which as illustrated, reveal the presence of the promotion in the inventory window 434 (i.e., "VG Olive Oil Rollback −$5"), as well as a total price 432 and an associated customer account 412.

At the time of checkout, the customer clicks "checkout" button 426, which reveals another QR code 428 which may contain, for example, information leading to the customer account 412. The QR code 428 can be read by scanner 310, and therethrough, providing the merchandise information checkout station 320 directly or indirectly with the contents of the shopping cart together with any pertinent indicia that indicates capture of a promotion. Checkout is then completed, together with the application of all validated and timely captured promotions. Payment is then received. A receipt is provided to the customer. The merchandise is bagged and taken away.

Instead of a smartphone or other handheld device, one can also use, as the mobile device, a so-called "smart shopping cart". These shopping carts are typically equipped with a handle-mounted tablet computer providing an electronic RFID or optical bar scanner and active communication ports into the retailer's computer network. Technical components and examples of such smart shopping carts are discussed, for example, in U.S. Pat. No. 6,910,697, issued to A. Varatharajah et al. on Jun. 28, 2005; U.S. Pat. No. 6,484,939, issued to D. C. Blaeuer on Nov. 26, 2002; U.S. Pat. No. 6,435,407, issued to L. Fiordelisi on Aug. 20, 2002; U.S. Pat. No. 7,648,068, issued to K. Silverbrook et al. on Jan. 19, 2010; and U.S. Pat. No. 4,929,819, issued to D. A. Collins, Jr. on May 29, 1990.

Although commonly used in combination with sophisticated self-service checkout systems, most commercially-available smart shopping carts have fixed scanners, i.e., scanners that would have limited mobility and "reach" for scanning bar codes on similarly fixed displays. These can nonetheless be used for embodiments of the invention where an item of merchandise, rather than a fixed shelf-mounted ESL, is brought to the device and scanned. For embodiments where fixed shelf-mounted ESL are deployed, a separate handheld scanner plugged into or otherwise communicably connected to the smart shopping cart could be employed.

Although several embodiments of the invention are disclosed hereinabove, those skilled in the art having the benefits of this disclosure can effect modifications thereto. These modifications are to be construed as being encompassed within the scope of the present invention as set forth in the appended claims.

The invention claimed is:

1. A merchandise promotion system for use in a retail shopping facility, the system comprising a merchandise information source, a merchandise information node, and a merchandise information checkpoint that communicate with each other via a computer network, the merchandise information source comprises an interface for input of limited-time merchandise information of a promotion and a transmitter for transmission of said limited-time merchandise information to the merchandise information node, the limited-time merchandise information being associated with an item of merchandise and including a promotional component and a time component including a specified expiration, the merchandise information source configured for receiving and processing scripted parameters of the promotion;

the merchandise information node comprises a receiver for reception of said limited-time merchandise information and a display for visual presentation of said limited-time merchandise information at a first state of the merchandise information node and at a second state of the merchandise information node after the specified expiration of the time component of the limited-time merchandise information for visual presentation of information about the item of merchandise, the first and second states including different visual presentations, including the first state including the display of said limited-time merchandise information and the second state including an absence of the display of said limited-time merchandise information, the display for visual presentation providing a prompt for performance of an electronically-recordable customer transaction that ensues from the promotional prompt; and the merchandise information checkpoint comprises an electronic processor that affects a purchase of said item as a function of said electronically-recordable customer transaction, said information including expiration data captured at a time of the electronically recordable customer transaction at the merchandise information node, the merchandise information checkpoint according to a validation rule consummating the purchase of said item including redeeming the electronically captured promotion by determining from the electronically-recordable customer transaction stored at a location accessed by the merchandise information checkpoint that the prompt at the merchandise information node is responded to by a mobile device at the merchandise information node, the merchandise information checkpoint according to the validation rule executing a process that includes the scripted parameters of the promotion to effect the promotion when the prompt is activated by the mobile device at the merchandise information node; and an application installed and executed on the mobile device further configured to (1) electronically record the customer transaction when the mobile device is proximal to and in communication with the merchandise information node and (2) generate a time stamp contemporaneously with the electronic recordation to establish a time of acceptance of the promotion prior to the specified expiration in response to the promotional prompt published at the merchandise information node, and the mobile device is further configured to (3) facilitate and communicate an acceptance and validation of the promotion to the merchandise information checkpoint, the merchandise information checkpoint processes the time stamp to affect the purchase of the customer transaction electronically recorded by the mobile device, the merchandise information checkpoint validates the promotion by confirming the time stamp is prior to the specified expiration, and the promotion takes effect only for a user of the mobile device in response to the mobile device application processing the electronically-recordable customer transaction.

2. The merchandise promotion system of claim 1, the merchandise information node comprising an electronic shelf label, and the display and the receiver are provided by the electronic shelf label.

3. The merchandise promotion system of claim 2, said information further includes data for generating an optically-scannable bar code image at said electronic shelf label before performing a scanning operation by the mobile device, the optically-scannable bar code providing said prompt for said performance of said electronically-recordable transaction.

4. The merchandise promotion system of claim 3, further comprising programming executable on a portable device;
the portable device having an optical scanner and data storage;
the programming driving said optical scanner to capture said optically-scannable bar code image; and
the capture of said image being recorded as capture data in the data storage of the portable device, thereby providing said electronically-recordable customer transaction.

5. The merchandise promotion system of claim 4,
the merchandise information electronically communicating with the portable device for acquisition of the capture data from the portable device; and
the electronic processor affecting said purchase of said item as a function of said capture data.

6. The merchandise promotion system of claim 3, the duration of the visual presentation of said optically-scannable bar code image at the electronic shelf label is limited by the expiration data.

7. The merchandise promotion system of claim 1,
the merchandise information checkpoint in communication with said merchandise information source for acquisition of said expiration data.

8. The merchandise promotion system of claim 7, further comprising programming executable on a portable device;
the portable device having an item tag scanner and data storage;
the programming driving said item tag scanner to scan an item tag associated with said item of merchandise; and
the scan being recorded as capture data in the data storage in combination with a date/time stamp, and thereby, providing said electronically-recordable customer transaction.

9. The merchandise promotion system of claim 8, said electronic processor affecting said purchase of said item as a function of (a) said capture data and (b) a comparison of the expiration date and the date/time stamp.

10. The merchandise promotion system of claim 1, the merchandise information checkpoint located at a point-of-sale checkout location.

11. The merchandise promotion system of claim 1,
said limited-time merchandise information includes a promotional price, the promotional price being less than a price for said item after said specified expiration; and
the automatic effect on said purchase is the application of the promotional price.

12. A method for a transmission and validation of promotional information in a retail store facility, the promotional information being associated with an item of merchandise sold in said facility, the method comprising the step of:
providing a computer program executable on a portable device, the portable device having an electronic scanner and data storage, and the computer program driving the electronic scanner to scan an electronically-scannable tag and recording the scanned data in said data storage;
providing an electronic shelf label device, the electronic shelf label device capable of receiving and visually displaying said promotional information at a first state of the electronic shelf label device, and at a second state after a specified expiration time specified in the promotional information, the first and second states including different visual presentations, including the first state including the display of said limited-time merchandise information and the second state including an absence of the display of said limited-time merchandise information;
transmitting said promotional information to said electronic shelf label device, the promotional information being visually-presented by said electronic shelf label device to provide a promotional prompt for a customer equipped with said portable device to read said electronically-scannable tag;
checking for the presence of scanned data recorded in the data storage of a portable device at a checkout register in said retail facility, the presence of said scanned data providing complete or partial validation of said promotional information for a customer bearing said portable device at said checkout register, said promotional information including expiration data captured at a time of an electronically-recordable customer transaction at the electronic shelf label device that ensues from the promotional prompt;
validating, redeeming, or applying a promotion at a merchandise information checkpoint;
determining whether the prompt at the electronic shelf label is selected;
consummating according to a validation rule the purchase of said item including redeeming the electronically captured promotion by determining that the promotional prompt at the electronic shelf label device is responded to by a mobile device at the merchandise information node, including:
electronically recording by the mobile device the customer transaction in response to the promotional prompt published at the merchandise information node;
generating a time stamp contemporaneously with the electronic recordation to establish a time of acceptance of the promotion prior to the specified expiration in response to the promotional prompt published at the merchandise information node, the time stamp affects the purchase of the customer transaction electronically recorded by the mobile device;
and facilitating and communicating by an application executed by the mobile device an acceptance of the promotion to the merchandise information checkpoint, the merchandise information checkpoint according to the validation rule executing a process that includes the scripted parameters of the promotion to effect the promotion when the prompt is activated by the mobile device at the merchandise information node, the validation rule includes confirming the time stamp is prior to the specified expiration, and the promotion takes effect only for a user of the mobile device in response to the mobile device application processing electronically-recordable customer transaction.

13. The method of claim 12, the electronically-scannable tag being an optically-scannable bar code, data for the bar-code being included within the promotional information.

14. The method of claim 12, the promotional information including a discounted price, and the discounted price automatically applied for purchase of said item of merchandise at said checkout register as a function of said validation.

15. The method of claim 12, the visual-display of said promotion informational having a predefined duration, and the presence of said scanned data resulting in an application of a promotional benefit at check out.

16. The method of claim 12, said portable device providing and recording a date/time stamp in association with said scanned data, and validation being a function of both (a) the presence of said scanned data and (b) said date/time stamp.

* * * * *